United States Patent
Rajan et al.

(10) Patent No.: US 10,738,179 B2
(45) Date of Patent: Aug. 11, 2020

(54) RUBBER MIXTURE AND PNEUMATIC VEHICLE TIRE

(71) Applicant: Continental Reifen Deutschland GmbH, Hannover (DE)

(72) Inventors: Vipin Rajan, Ronnenberg (DE);
Martin Francke, Garbsen (DE);
Marion Schellenberg, Hannover (DE);
Catarina Sa, Isernhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 63 days.

(21) Appl. No.: 16/069,894

(22) PCT Filed: Oct. 17, 2016

(86) PCT No.: PCT/EP2016/074831
§ 371 (c)(1),
(2) Date: Jul. 13, 2018

(87) PCT Pub. No.: WO2017/129276
PCT Pub. Date: Aug. 3, 2017

(65) Prior Publication Data
US 2019/0023881 A1  Jan. 24, 2019

(30) Foreign Application Priority Data
Jan. 26, 2016 (DE) .................. 10 2016 201 053

(51) Int. Cl.
| C08L 15/00 | (2006.01) |
| B60C 1/00 | (2006.01) |
| C08L 7/00 | (2006.01) |
| C08L 9/00 | (2006.01) |
| C08K 3/36 | (2006.01) |
| C08K 5/548 | (2006.01) |

(52) U.S. Cl.
CPC ............ *C08L 15/00* (2013.01); *B60C 1/0025* (2013.01); *C08K 3/36* (2013.01); *C08K 5/548* (2013.01); *C08L 7/00* (2013.01); *C08L 9/00* (2013.01); *C08K 2201/006* (2013.01); *C08L 2201/08* (2013.01); *C08L 2205/03* (2013.01); *C08L 2312/08* (2013.01); *Y02T 10/862* (2013.01)

(58) Field of Classification Search
CPC .................................. C08L 15/00; B60C 1/00

USPC ........................................................ 524/493
See application file for complete search history.

(56) References Cited

U.S. PATENT DOCUMENTS

| 6,667,361 | B2 | 12/2003 | Masson et al. |
| 8,426,512 | B2* | 4/2013 | Zhang .................. B60C 1/0016 152/209.5 |
| 8,569,409 | B2 | 10/2013 | Thiele et al. |
| 8,846,791 | B2* | 9/2014 | Hattori .................. B60C 1/0016 524/262 |
| 2005/0016651 | A1 | 1/2005 | Durel et al. |
| 2008/0161458 | A1* | 7/2008 | Fox ........................ B60C 1/0016 524/262 |
| 2010/0218871 | A1* | 9/2010 | Matsushita ........... B60C 1/0016 152/450 |
| 2011/0048605 | A1* | 3/2011 | Zhang ....................... C08L 9/00 152/525 |
| 2011/0077343 | A1 | 3/2011 | Ishikawa et al. |
| 2011/0144236 | A1 | 6/2011 | Mihara |
| 2012/0252952 | A1* | 10/2012 | Thiele .................. B60C 1/0016 524/425 |
| 2012/0289647 | A1* | 11/2012 | Koelle .................. B60C 1/0016 524/525 |
| 2013/0030097 | A1 | 1/2013 | Salgues et al. |
| 2014/0171556 | A1 | 6/2014 | Kramer et al. |
| 2016/0194485 | A1 | 7/2016 | Herzog et al. |

FOREIGN PATENT DOCUMENTS

| CN | 101316730 A | 12/2008 |
| DE | 102008037593 A1 | 5/2010 |
| DE | 102010037004 A1 | 2/2012 |
| EP | 1419195 B1 | 5/2004 |
| WO | 2007047943 A2 | 4/2007 |

\* cited by examiner

*Primary Examiner* — Deve V Hall
(74) *Attorney, Agent, or Firm* — David L. Cate; Gregory Adams

(57) ABSTRACT

The invention relates to a sulfur-crosslinkable rubber mixture, especially for the sidewall of pneumatic vehicle tires, and to a pneumatic vehicle tire whose sidewall consists at least partly of the sulfur-crosslinked rubber mixture. For reduced hysteresis, hence leading to low rolling resistance when used as a sidewall mixture, the rubber mixture comprises
20 to 80 phr of natural rubber and/or synthetic polyisoprene,
20 to 80 phr of at least one polybutadiene functionalized for attachment to silica and
20 to 50 phr of at least one silica with a CTAB surface area (to ASTM D 3765) of 50 to 130 $m^2/g$ and a nitrogen surface area (BET surface area) (to DIN ISO 9277 and DIN 66132) of 60 to 140 $m^2/g$.

9 Claims, No Drawings

RUBBER MIXTURE AND PNEUMATIC VEHICLE TIRE

The invention relates to a sulfur-crosslinkable rubber mixture, especially for the sidewall of pneumatic vehicle tires, and to a pneumatic vehicle tire wherein the sidewall consists at least partly of the sulfur-crosslinked rubber mixture.

It is customary that the sidewalls of a pneumatic vehicle tire are based on a rubber mixture comprising carbon black. This carbon black component in the sidewalls brings about a low electrical resistance of the sidewall and assures the dissipation of the electrostatic charges that arise in the course of driving from the wheel rim via the sidewalls and parts of the tread down to the road.

However, reduction in the rolling resistance of tires is becoming increasingly important. It is known that the tire can be provided with mixtures of low hysteresis and hence low rolling resistance, especially in the tread. The measures that are used to reduce the rolling resistance of a rubber mixture include the use of fillers of low activity, the use of a small amount of active filler, or the use of silica rather than carbon black as filler.

EP 1 419 195 B1 discloses, for example, tread mixtures which, for improvement of the tire properties, comprise silicas having a low specific surface area (low surface area). The BET surface area of these silicas is less than 130 m²/g.

However, the aforementioned measures for reducing the rolling resistance lead to an increase in the electrical resistance of the mixtures, and so alternatives have to be found for dissipation of charge in the tire.

If the tread is being produced from a mixture having low rolling resistance and a high level of silica filler, it is known, for example, that what is called a carbon center beam composed of a mixture with a high level of carbon black filler can be incorporated into the tread.

In order to further reduce the rolling resistance of tires, there is now also a move toward designing the body mixtures of the tire, i.e. the sidewalls or the rubberizing mixtures, with low rolling resistance. The paths for dissipation of the electrical charge then have to be made by other routes than via the sidewall mixture or rubberizing mixtures.

In order to ensure the dissipation of charge in such a case, for example, DE 10 2010 037 004 A1 discloses a pneumatic vehicle tire wherein the sidewalls consist of an electrically nonconductive rubber material. In this case, an electrically conductive element in the form of a thread, cable or strip is wound in a spiral around the sidewalls. The electrically conductive element is a metallic filament, a cord composed of the same, or a strip manufactured from an electrically conductive rubber mixture.

The problem addressed by the present invention is that of providing a sulfur-crosslinkable rubber mixture which has reduced hysteresis and thus leads to low rolling resistance when used as sidewall mixture.

This object is achieved by a sulfur-crosslinkable rubber mixture comprising
20 to 80 phr of natural rubber and/or synthetic polyisoprene,
20 to 80 phr of at least one polybutadiene functionalized for attachment to silica and
20 to 50 phr of at least one silica with a CTAB surface area (to ASTM D 3765) of 50 to 130 m²/g and a nitrogen surface area (BET surface area) (to DIN ISO 9277 and DIN 66132) of 60 to 140 m²/g.

Surprisingly, the rubber mixture of the invention, by virtue of the specific combination of the constituents in the specified amounts, has distinctly reduced hysteresis, which leads to reduced rolling resistance when used in the tire.

The unit "phr" (parts per hundred parts of rubber by weight) used in this document is the standard unit of amount for blend recipes in the rubber industry. The dosage of the parts by weight of the individual substances is based in this document on 100 parts by weight of the total mass of all high molecular weight and hence solid rubbers present in the mixture.

The rubber mixture of the invention contains 20 to 80 phr of natural rubber and/or synthetic polyisoprene. Synthetic polyisoprene may be either cis-1,4-polyisoprene or 3,4-polyisoprene. However, the use of cis-1,4-polyisoprenes with a cis-1,4 content>90% by weight is preferred. Such a polyisoprene can be obtained by stereospecific polymerization in solution with Ziegler-Natta catalysts or using finely divided lithium alkyls. Natural rubber (NR) is likewise one such cis-1,4-polyisoprene; the cis-1,4 content in the natural rubber is greater than 99% by weight.

In addition, also conceivable is a mixture of natural rubber with one or more synthetic polyisoprenes.

The rubber mixture also contains 20 to 80 phr of at least one polybutadiene functionalized for attachment to silica. The polybutadiene may be any of the types known to those skilled in the art having an $M_w$ of 250 000 to 5 000 000 g/mol. These include so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li-BR (lithium-catalyzed butadiene rubber) having a cis content of 20% to 50% by weight. High-cis polybutadiene can be prepared, for example, with neodymium as catalyst and results in low hysteresis of the rubber mixture. The polybutadiene has been functionalized for attachment to silica, meaning that it has a group which allows binding to the polar groups of the silica via polar groups.

The polybutadiene may have been functionalized with such groups along the polymer chain. However, it is particularly advantageous when the polybutadiene has been modified with such groups at the polymer ends.

The polybutadiene has preferably been end group-modified with a silane sulfide. With such a modification, the best results were achieved with regard to the reduction in hysteresis. Polybutadienes of this kind are, for example, those which have been end group-modified with silane sulfides of the following structure:

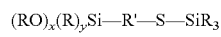

where Si is silicon, S is sulfur and O is oxygen,
x is selected from 1, 2 and 3 and y is selected from 0, 1 and 2 with x+y=3,
R are the same or different and are selected from $C_1$-to $C_{16}$-alkyl radicals and
R' is selected from aryl, alkylaryl and $C_1$-to $C_{16}$-alkyl radicals.

Polybutadienes of this kind and the preparation thereof are described, for example, in WO 2007/047943 A2.

In an advantageous development of the invention, the rubber mixture comprises 20 to 60 phr of natural rubber and/or synthetic polyisoprene and 40 to 80 phr of at least one polybutadiene functionalized for attachment to silica. With these proportions, it is possible to achieve particularly good rolling resistance values in the tire, with the other tire properties remaining at a good level.

The rubber mixture may also comprise further diene rubbers up to an amount of not more than 10 phr. Diene rubbers refer here to rubbers that are formed by polymerization or copolymerization of dienes and/or cycloalkenes and thus have C=C double bonds either in the main chain or in the side groups. The further diene rubbers are, for example, styrene-butadiene copolymer (styrene-butadiene rubber) and/or epoxidized polyisoprene and/or styrene-isoprene rubber and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

However, the further diene rubber(s) are preferably styrene-butadiene copolymers (SBR, styrene-butadiene rubber), which may also have been modified with functional groups.

The rubber mixture comprises 20 to 50 phr of at least one silica with a CTAB surface area (to ASTM D 3765) of 50 to 120 m$^2$/g, preferably 70 to 120 m$^2$/g, and a nitrogen surface area (BET surface area) (to DIN ISO 9277 and DIN 66132) of 60 to 140 m$^2$/g, preferably 80 to 125 m$^2$/g. Owing to their low specific surface area, these silicas are also referred to as "low surface area" silicas. It is also possible to use multiple silicas having such surface characteristics in the mixture. The terms "silicic acid" and "silica" are used synonymously in the context of the present invention, as is customary in the specialist field. It is possible to use, for example, Zeosil® 1085 or Zeosil® 1115 from Solvay, France.

In order to further reduce the rolling resistance when the rubber mixture is used in a sidewall of a pneumatic vehicle tire, it has been found to be advantageous when the rubber mixture contains 4 to 11 phf of at least one blocked and/or unblocked mercaptosilane.

The expression phf (parts per hundred parts of filler by weight) used in this text is the conventional unit of amount for coupling agents for fillers in the rubber industry. In the context of the present application, phf relates to the silica(s) present, meaning that any other fillers present, such as carbon black, are not included in the calculation of the amount of mercaptosilane.

The blocked and/or unblocked mercaptosilanes serve as silane coupling agents. In silica-containing mixtures, they serve to improve the processibility and attachment of the polar filler to the rubber. The silane coupling agents react with the surface silanol groups of the silica or other polar groups during the mixing of the rubber or of the rubber mixture (in situ) or in the manner of a pretreatment (premodification) even before addition of the filler to the rubber. The silane coupling agents may also be added as a mixture with industrial black. It is possible to use, for example, mercaptosilanes that are sold under the NXT® name in various variants by Momentive, USA. What are called NXT® silanes are suggested by Momentive, USA in combination with silicas having high specific surface area and functionalized polymers in order to achieve easy processibility of high-performance mixtures.

By unblocked mercaptosilanes are meant silanes which have an —S—H group, i.e. a hydrogen atom on the sulfur atom. By blocked mercaptosilanes are meant silanes which have an S—PG group, where PG is the abbreviation for a protective group on the sulfur atom. Preferred protective groups, as set out below, are acyl groups.

The expression "blocked and/or unblocked mercaptosilane" means that the rubber mixture of the invention may comprise a blocked silane, an unblocked silane, or a mixture of blocked and unblocked silane.

To the skilled person, it is clear that this detail relates to the initial state of the constituents of the sulfur-crosslinkable rubber mixture, and that the protective groups are eliminated during the mixing process and/or during vulcanization, and the respective sulfur atoms react chemically.

The blocked and/or unblocked mercaptosilane preferably has the general empirical formula I):

$(R^4)_3Si—Z—S—R^5$                                                     I)

where the R$^4$ radicals may be the same or different within one molecule and are alkoxy groups having 1 to 10 carbon atoms, where R$^5$ is an acyl group having 1 to 20 carbon atoms or is a hydrogen atom, and where Z is an alkyl group having 1 to 10 carbon atoms.

S is the abbreviation for sulfur, and Si for silicon.

Blocked mercaptosilanes bear a protecting group on the sulfur atom, the R$^5$ group in formula I) in the present case, and for that reason are also called "protected mercaptosilanes".

In a preferred embodiment of the invention, the mercaptosilane comprises the blocked mercaptosilane 3-octanoylthio-1-propyltriethoxysilane, meaning that in formula I) stated above, all R$^4$ radicals are ethoxy (OEt), Z is a propyl group and R$^5$ is an octanoyl group. With this mercaptosilane, particularly good results were achieved with regard to processing characteristics and tire properties.

As well as the constituents essential to the invention that have already been elucidated in detail, the rubber mixture may comprise further constituents customary in the rubber industry. Constituents of this kind are elucidated hereinafter:

The rubber mixture may comprise carbon black as a further filler in amounts up to 10 phr. All types of carbon black known to those skilled in the art are conceivable. Preference is given, however, to using a carbon black having an iodine adsorption number to ASTM D 1510 of 30 to 180 g/kg, preferably 30 to 130 kg/g, and a DBP number to ASTM D 2414 of 80 to 200 mL/100 g, preferably 100 to 200 mL/100 g, more preferably 100 to 180 mL/100 g. For the application in the vehicle tire, this achieves particularly good rolling resistance indicators (rebound resilience at 70° C.) combined with other good tire properties.

The rubber mixture of the invention may, as well as "low surface area" silica and carbon black, also comprise further known polar and/or nonpolar fillers, such as further silicas, aluminosilicates, chalk, starch, magnesium oxide, titanium dioxide or rubber gels. Additionally conceivable are carbon nanotubes (CNTs, including discrete CNTs, what are called hollow carbon fibers (HCFs) and modified CNTs containing one or more functional groups, such as hydroxyl, carboxyl and carbonyl groups).

Graphite and graphenes and also "carbon-silica dual-phase filler" are also conceivable as filler.

In the context of the present invention, zinc oxide does not belong to the group of fillers.

The rubber mixture of the invention may comprise other silanes known in the prior art, such as TESPD (3,3'-bis(triethoxysilylpropyl) disulfide) or TESPT (3,3'-bis(triethoxysilylpropyl) tetrasulfide) or octyltriethoxysilanes (e.g. Si208®, from Evonik).

However, it preferably does not contain any further silane apart from the mercaptosilane; in other words, it is preferably free of further silanes such as TESPD (3,3'-bis(triethoxysilylpropyl) disulfide) or TESPT (3,3'-bis(triethoxysilylpropyl) tetrasulfide) or octyltriethoxysilanes (e.g. Si208®, from Evonik).

It is possible for plasticizers to be present in the rubber mixture in amounts of 1 to 50 phr. Small amounts of plasticizer are added essentially with regard to particularly good processibility of the rubber mixture, especially to the extrudates prior to crosslinking, whereas high amounts of plasticizer in the car tire sector serve to adjust the mixture hardness.

Plasticizers that can be used include all the plasticizers that are known to those skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL), preferably having a content of polycyclic aromatics of less than 3% by weight according to method IP 346 or rapeseed oil or factices or plasticizer resins or liquid polymers, such as liquid polybutadiene—including in modified form. The plasticizer(s) is/are preferably added in at least one base-mixing stage in the production of the rubber mixture of the invention.

Furthermore, the rubber mixture may comprise customary additives in customary parts by weight, which are added preferably in at least one base-mixing stage in the course of production of the mixture. These additives include a) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N,N'-di(1,4-dimethylpentyl)-p-phenylenediamine (77PD), 2,2,4-trimethyl-1,2-dihydroquinoline (TMQ), b) activators, for example zinc oxide and fatty acids (e.g. stearic acid) or zinc complexes, for example zinc ethylhexanoate, c) waxes, d) masticating aids, for example 2,2'-dibenzamidodiphenyl disulfide (DBD), and e) processing aids, for example fatty acid salts, for example zinc soaps, and fatty acid esters and derivatives thereof.

The proportion of the total amount of further additives is 3 to 100 phr, preferably 5 to 80 phr.

The total proportion of the further additives also includes 0.1 to 10 phr, preferably 1 to 8 phr, more preferably 1.5 to 4 phr, of zinc oxide (ZnO).

This may be any type of zinc oxide known to those skilled in the art, for example ZnO pellets or powder. The conventionally used zinc oxide generally has a BET surface area of less than 10 $m^2/g$. However, it is also possible to use zinc oxides having a BET surface area of 10 to 100 $m^2/g$, for example what are called "nano zinc oxides".

It is customary to add zinc oxide as an activator to a rubber mixture for sulfur crosslinking with vulcanization accelerators, usually in combination with fatty acids (e.g. stearic acid). The sulfur is then activated for the vulcanization by complex formation.

The rubber mixture may also comprise bonding systems, for example cobalt salts, and strengthener resins (e.g. resorcinol-HMMM/HMT).

The vulcanization of the sulfur-crosslinkable rubber mixture according to the invention is performed in the presence of sulfur and/or sulfur donors with the aid of vulcanization accelerators, wherein a number of vulcanization accelerators can simultaneously act as sulfur donors. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS) and/or diphenylguanidine (DPG).

It is also possible for the rubber mixture to comprise vulcanization retardants.

Sulfur donor substances used may be any sulfur donor substances known to those skilled in the art. If the rubber mixture comprises a sulfur donor substance, it is preferably selected from the group comprising, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems as obtainable, for example, under the Vulkuren®, Duralink® or Perkalink® trade names or network-forming systems as described in WO 2010/049216 A2 can also be used in the rubber mixture. The latter system contains a vulcanizing agent which crosslinks with a functionality of greater than four and at least one vulcanization accelerator.

In the context of the present invention, sulfur and sulfur donors, including sulfur-donating silanes such as TESPT, and vulcanization accelerators as described above and vulcanizing agents which crosslink with a functionality of greater than four, as described in WO 2010/049216 A2, and also the abovementioned Vulkuren®, Duralink® and Perkalink® systems are encompassed by the term "vulcanizing agent".

In the course of production, preference is given to adding to the rubber mixture of the invention at least one vulcanizing agent selected from the group comprising sulfur and/or sulfur donors and/or vulcanization accelerators and/or vulcanizing agents that crosslink with a functionality of greater than four in the final mixing stage. This makes it possible to produce a sulfur-crosslinked rubber mixture from the mixed finished mixture by vulcanization, especially for use in the pneumatic vehicle tire.

The terms "vulcanized" and "crosslinked" are used synonymously in the context of the present invention.

The sulfur-crosslinkable rubber mixture according to the invention is produced by the process customary in the rubber industry in which initially, in one or more mixing stages, a preliminary mixture comprising all constituents except the vulcanization system (sulfur and vulcanization-influencing substances) is produced. The final mixture is produced by adding the vulcanization system in a final mixing stage. The finished mixture is processed further, for example, by an extrusion operation and converted to the appropriate shape. This is followed by further processing by vulcanization, wherein owing to the vulcanization system added in the context of the present invention sulfur crosslinking takes place.

The rubber mixture can be used for various rubber articles.

However, the rubber mixture preferably finds use as sidewall in pneumatic vehicle tires, which are understood to mean pneumatic vehicle tires for industrial and construction site vehicles, trucks, cars and two-wheeled vehicle tires.

A pneumatic vehicle tire with improved rolling resistance is obtained when the sidewall consists at least partly of the sulfur-crosslinked rubber mixture.

For use as a sidewall in pneumatic vehicle tires, the mixture as a finished mixture prior to vulcanization is shaped to a sidewall and is applied in the known manner in the production of the green vehicle tire. Alternatively, the sidewall can be rolled up in the form of a narrow strip of rubber mixture on to a green tire.

The invention is now to be elucidated in detail with reference to comparative examples and working examples, which are summarized in table 1.

The comparative mixtures are identified by C, the inventive mixtures by I.

The mixture was produced by the methods customary in the rubber industry under standard conditions in three stages in a laboratory mixer, in which all the constituents apart from the vulcanization system (sulfur and vulcanization-influencing substances) were first mixed in the first mixing stage (base-mixing stage). In the second mixing stage the preliminary mixture was mixed again. By addition of the vulcanization system in the third stage (ready-mixing stage), the finished mixture was produced, with mixing at 90 to 120° C.

All mixtures were used to produce test specimens by vulcanization for 20 min under pressure at 160° C., and these test specimens were used to determine material properties customary for the rubber industry with the test methods specified hereinafter.

Shore A hardness at room temperature (RT) and 70° C. to DIN ISO 7619-1

Rebound resilience (rebound) at room temperature and 70° C. to DIN 53 512

Stress value at 300% elongation at room temperature in accordance with DIN 53 504

Dynamic storage modulus E' at 55° C. from dynamic-mechanical measurement according to DIN 53 513, strain sweep at 0.15% and 8% elongation Maximum (max) loss factor tan δ (tangent delta) from dynamic-mechanical measurement at 55° C. to DIN 53 513, strain sweep

TABLE 1

| Constituents | Unit | 1 (C) | 2 (C) | 3 (C) | 4 (I) | 5 (I) |
|---|---|---|---|---|---|---|
| Natural rubber | phr | 30 | 70 | 30 | 30 | 30 |
| BR 1[a] | phr | 70 | 30 | — | — | — |
| BR 2[b] | phr | — | — | 70 | 70 | 70 |
| Silica A[c] | phr | 35 | 35 | 35 | — | — |
| Silica B[d] | phr | — | — | — | 35 | 35 |
| Silane coupling agent [e] | phr | 2.5 | 2.5 | 2.5 | 1.4 | — |
| Blocked mercaptosilane[f] | phr | — | — | — | — | 2.0 |
| Plasticizer, aging stabilizer, antiozonant wax | phr | 22.5 | 22.5 | 22.5 | 22.5 | 22.5 |
| Vulcanization aid | phr | 4 | 4 | 4 | 4 | 4 |
| Sulfur, sulfenamide and guanidine accelerator | phr | 4.3 | 4.3 | 4.3 | 4.3 | 4.3 |
| Properties | | | | | | |
| Shore A hardness at RT | ShoreA | 50.8 | 45.55 | 51.05 | 52.35 | 51.7 |
| Shore A hardness at 70° C. | ShoreA | 48.9 | 42.65 | 49. | 51.25 | 50.45 |
| Rebound resilience at RT | % | 65.19 | 61.83 | 70.65 | 73.01 | 72.45 |
| Rebound resilience 70° C. | % | 68.8 | 70.25 | 1.2 | 77.625 | 78.035 |
| Stress value 300% | MPa | 3.201 | 3.191 | 3.589 | 4.137 | 4.031 |
| E' (at 55° C., 0.15% elongation) | MPa | 4.73 | 3.49 | 4.64 | 4.38 | 4.24 |
| E' (at 55° C., 8% elongation) | MPa | 4.15 | 3.12 | 4.39 | 4.15 | 4.04 |
| Max. tan δ at 55° C. | — | 0.0747 | 0.0736 | 0.0716 | 0.0433 | 0.0443 |

[a]Nd polybutadiene rubber
[b]polybutadiene end group-functionalized with silane sulfide for attachment to silica and having a degree of functionalization of 80 to 100%, 0% styrene content, 10% vinyl content, $T_g$ = −95° C.
[c]Ultrasil ® VN 3 GR, CTAB 167 $m^2$/g, BET 180 $m^2$/g, from Evonik Industries
[d]Zeosil ® 1085 GR, CTAB 80 $m^2$/g, BET 90 $m^2$/g, from Solvay
[e] $S_2$ Silane: TESPD
[f]blocked mercaptosilane: 3-(octanoylthio)-1-propyltriethoxysilane, from Momentive Table 1 shows that only the mixtures 4(I) and 5(I) having the specific combination of the polymers with the specific silica lead to distinctly reduced hysteresis (small tan δ values, high rebound resiliences at 70° C.). This effect is not achievable through the sole use of the polymer BR 2, as shown in mixture 3(C). Smaller tan δ values and greater rebound resiliences at 70° C. correlate with reduced rolling resistance in the case of use as a sidewall mixture in pneumatic vehicle tires.

Rebound resilience at 70° C. can be further increased with regard to a further reduction in rolling resistance in that a mercaptosilane is used in the mixture (see 5(I)).

The invention claimed is:

1. A pneumatic vehicle tire sidewall comprising a sulfur-crosslinkable rubber mixture comprising:
    20 to 80 phr of natural rubber and/or synthetic polyisoprene;
    20 to 80 phr of at least one polybutadiene functionalized for attachment to silica; and,
    20 to 50 phr of at least one silica with a CTAB surface area (to ASTM D 3765) of 50 to 130 m²/g and a nitrogen surface area (BET surface area) (to DIN ISO 9277 and DIN 66132) of 60 to 140 m²/g.

2. The pneumatic vehicle tire sidewall as claimed in claim 1, wherein the at least one polybutadiene functionalized for attachment to silica has been end group-modified with a silane sulfide.

3. The pneumatic vehicle tire sidewall as claimed in claim 1, wherein the rubber mixture comprises 20 to 60 phr of the natural rubber and/or synthetic polyisoprene and 40 to 80 phr of the at least one polybutadiene functionalized for attachment to silica.

4. The pneumatic vehicle tire sidewall as claimed in claim 1, wherein the at least one silica has a CTAB surface area (to ASTM D 3765) of 70 to 120 m²/g and a nitrogen surface area (BET surface area) (to DIN ISO 9277 and DIN 66132) of 80 to 125 m²/g.

5. The pneumatic vehicle tire sidewall as claimed in claim 1, wherein the rubber mixture further comprises 4 to 11 phr of at least one blocked and/or unblocked mercaptosilane.

6. The pneumatic vehicle tire sidewall as claimed in claim 5, wherein the blocked and/or unblocked mercaptosilane has the general empirical formula I):

$$(R^4)_3Si\text{—}Z\text{—}S\text{—}R^5 \qquad \text{I)}$$

wherein the radicals $R^4$ may be identical to or different from one another within one molecule, and are alkoxy groups having 1 to 10 carbon atoms;

wherein $R^5$ is an acyl group having 1 to 20 carbon atoms or is a hydrogen atom; and, wherein Z is an alkyl group having 1 to 10 carbon atoms.

7. The pneumatic vehicle tire sidewall as claimed in claim 6, wherein the mercaptosilane is the blocked mercaptosilane 3-octanoylthio-1-propyltriethoxysilane.

8. The pneumatic vehicle tire sidewall as claimed in claim 1, the rubber mixture further comprising less than 10 phr of at least one carbon black.

9. A pneumatic vehicle tire sidewall as claimed in claim 1, wherein the sidewall consists at least partly of the sulfur-crosslinked rubber mixture.

* * * * *